(12) United States Patent
Ochab et al.

(10) Patent No.: US 8,613,351 B2
(45) Date of Patent: Dec. 24, 2013

(54) CENTRIFUGAL CLUTCH WITH HEAT MITIGATING SPRING ARRANGEMENT

(75) Inventors: David C. Ochab, Horseheads, NY (US); Scott C. Schneider, Vestal, NY (US); Steven M. Averill, Beaver Dams, NY (US)

(73) Assignee: The Hilliard Corporation, Elmira, NY (US)

( * ) Notice: Subject to any disclaimer, the term of this patent is extended or adjusted under 35 U.S.C. 154(b) by 322 days.

(21) Appl. No.: 13/113,700

(22) Filed: May 23, 2011

(65) Prior Publication Data
US 2012/0298465 A1 Nov. 29, 2012

(51) Int. Cl.
*F16D 43/18* (2006.01)

(52) U.S. Cl.
USPC ............. 192/105 BA; 192/76; 192/113.1

(58) Field of Classification Search
USPC ............................ 192/105 BA; 188/185
See application file for complete search history.

(56) References Cited

U.S. PATENT DOCUMENTS

| | | | | |
|---|---|---|---|---|
| 2,027,970 A | * | 1/1936 | Gillies | 192/105 BA |
| 2,799,376 A | * | 7/1957 | Binder | 192/105 BA |
| 2,833,384 A | * | 5/1958 | Wilson | 192/105 BA |
| 3,696,901 A | * | 10/1972 | Henry | 192/105 BA |
| 6,857,515 B2 | | 2/2005 | Barron et al. | |

OTHER PUBLICATIONS

Max-Torque web-site materials, http://www.maxtorque.com, 15 pages total, including: Max-Torque homepage, http://maxtorque. com, 2 pages; Max-Torque clutches, http:/maxtorgue.com/html/clutches.html, 2 pages; "SS (Six Shoe) Clutch", http:/maxtorgue.com/html/ss_clutch.html, 1 page; "Max-Torgue 4-Cycle Racing Clutches", http://www.maxtorque.com/html/racing.html, 5 pages; and"Selection Manual," http://www.maxtorque.com/lehane/html/selection.html, 5 pages. All undated but acknowledged as being earlier than the filed of the instant application.

"Clutch Maintenance," Max-Torque, 1 page, dated Aug. 1995.

"Centrifugal Clutches," Comet Industries, http://www.tecumsehuk.co.uk/tec1/cometccf.htm, 2 pages, undated but acknowledged as being earlier than the filing date of the instant application.

"Centrifugal Clutches," Noram web site materials, http://www.norman-clutch.com/clutches.htm, total 11 pages, including: "4000 Series," http://www.norman-clutch.com/clutches4000series.htm, 2 pages; "We Series," http://www.norman-clutch.com/clutchesweseries.htm, 2 pages;"Heavy Duty 1600 Series," http://www.normal-clutch.com/clutches1600series.htm, 2 pages "Industrial 1800 Series," http://www.norman-clutch.com/clutches1800series.htm, 2 pages; and "Heavy Duty 6000 Series," http://www.notman-clutch.com/clutches6000series.htm, 2 pages.

* cited by examiner

*Primary Examiner* — Rodney Bonck
(74) *Attorney, Agent, or Firm* — Drinker Biddle & Reath LLP

(57) ABSTRACT

A centrifugal clutch including a drive hub having a rotational axis, a drum coaxial with the driver, a plurality of shoes engaging the drive hub so as to rotate with the driver, each shoe having an aperture therethrough in the axial direction, the shoes being radially movable between a radially outward position in which the shoes contact a surface of the drum and a radially inward position in which the shoes are spaced apart from the drum, and a plurality of springs urging the shoes toward the radially inward position, each spring being located in the aperture of a corresponding shoe, each spring having a radially inward end engaging one of the shoes and an opposite radially outward end engaging the driver.

11 Claims, 8 Drawing Sheets

CENTRIFUGAL CLUTCH WITH HEAT MITIGATING SPRING ARRANGEMENT

FIELD OF THE INVENTION

This application relates to centrifugal clutches, and more particularly to spring arrangements in centrifugal clutches that increase the operational life of the clutches by inhibiting overheating of the springs.

BACKGROUND

A centrifugal clutch typically includes a drive hub or impeller configured so as to be rotated by an external power or driving source, a hollow drum coaxial with and disposed about the drive hub and configured to drive an external load, and one or more shoes located within the drum that are rotated relative to the drum by the driver. The shoes are generally adapted to move radially into and out of frictional engagement with the inside of the drum. The frictional engagement with the drum provides load transmission between the drive hub and the drum.

As the drive hub and the shoes rotate, the centrifugal force created by the rotation urges the shoes radially outward toward the drum. One or more springs are arranged to bias the shoes against the radial outward motion and towards the center of the driver. When the speed of rotation is sufficiently high, the centrifugal force acting on the shoes overcomes the force of the springs, urging the shoes to move outward sufficiently to engage the drum. The engagement of the shoes with the drum causes the drum, and thus, the external load, to rotate in combination with the shoes. The speed at which the clutch engages is, therefore, determined by a balance between the mass distribution of the shoes and the strength of the springs.

Centrifugal clutches are commonly used in, but not limited to, the drive trains of machines powered by small internal combustion engines for producing varying amounts of horsepower. These types of clutches have particular use in lower horsepower machines, such as wood chippers and go-karts, which typically operate at up to about 20 hp. The clutch is typically set to disengage when the engine is idling, and to engage when the engine is generating sufficient torque to drive the load effectively.

However, because the engagement between the shoes and the drum is based on friction, slippage always occurs. For example, when the centrifugal force first overcomes the spring force, the initial contact between the moving shoe and the stationary drum will result in slippage. As the speed of the motor increases, the centrifugal force produces additional friction. The amount of centrifugal force required to produce sufficient friction increases as the driven load increases. As with all clutches, this slippage is necessary to some degree to provide for a gradual acceleration of the driven component. In situations where the engine is operating at a fairly low speed the slippage may continue for some time. This produces a considerable amount of friction which, in turn, results in the generation of heat.

The clutch springs are typically made from a highly-resilient "spring" steel that is inherently not very heat-resistant. A further challenge is that springs are necessarily under considerable stress imposed by the centrifugal force of the shoes when the drive hub is rotating. In practice, a slipping centrifugal clutch can easily generate sufficiently high temperatures to cause the metal of the springs to relax, particularly when the springs are under heavy loading. As the springs relax, their spring force decreases, which then allows the shoes to engage at lower rotational speeds. The heat can also become sufficiently high so as to change the temper of the spring metal, further weakening the springs by changing their spring rates.

A decrease in the speed at which the clutch engages is generally undesirable, and in some cases unacceptable. For example, if a spring relaxes considerably, the shoes can engage the drum at even an idling speed. This can cause the driven component to begin to move when the engine is idling. In some instances, this can be an unacceptable safety concern. For example, in a go-kart, movement of the vehicle at idle, when people are typically getting into or out of the go-kart, can be very dangerous. Alternatively, the engine may stall if the clutch engages before the engine is producing sufficient torque to drive the load.

In one conventional centrifugal clutch, a single garter spring is used to hold the shoes radially inward. The garter spring is seated in slots, extending in a generally circumferential direction, on one side of the shoes. The garter spring is located close to the frictional surfaces of the shoes. As a result, the heat generated by the shoes transfers readily to the spring, reducing its operating life. It has been found with one centrifugal clutch of this type used in a transmission of a go-kart that the garter spring can relax sufficiently to affect the performance of the vehicle in as little as 30 minutes of driving.

In another conventional centrifugal clutch, separate coil springs are attached between each shoe and its neighbors. In this clutch, the ends of each spring are hooked into holes formed in the shoes. These hooks, and especially the bend where the hook joins the coiled part of the spring, are the most highly stressed parts of the springs. Also, because of their location relative to the shoes, the hooks heat up more than the rest of the spring. As a result, the heat causes the material to relax, allowing the hooks to deform and reducing the spring force.

In yet another conventional centrifugal clutch, separate C-clips are provided between adjacent pairs of shoes to urge the shoes radially inward. A design to mitigate this problem of overheating of the C-clip springs in this type of centrifugal clutch was disclosed in U.S. Pat. No. 6,857,515, issued Feb. 22, 2005, which is commonly owned with the present application Conventional centrifugal clutches have limited life, requiring frequent maintenance in order to maintain proper power transmission. A need, therefore, exists for an improved centrifugal clutch with a heat mitigating spring arrangement that extends the life of the springs used in the clutch.

SUMMARY

A centrifugal clutch is disclosed that is less susceptible to deterioration in its performance caused by overheating of the springs.

In one embodiment, a centrifugal clutch includes a drive hub having a rotational axis, a drum coaxial with the driver, a plurality of shoes engaging the drive hub so as to rotate with the driver, and a plurality of springs urging the shoes toward a radially inward position in which the shoes are spaced apart from the drum. Each shoe has an aperture therethrough in the axial direction, and is radially movable between a radially outward position in which the shoes contact a surface of the drum and the radially inward position. Each spring is located in the aperture of a corresponding shoe and has a radially inward end engaging one of the shoes and an opposite radially outward end engaging the driver.

In another embodiment, a centrifugal clutch includes a drive hub having a rotational axis and a drum coaxial with the driver. The drive hub includes a hub, a flange at one axial end of the hub, an end plate at an opposite axial end of the hub, and a plurality of lugs extending radially outward from the hub between the flange and the end plate, the lugs being spaced apart about the circumference of the hub. The clutch further includes a plurality of shoes each located between an adjacent pair of lugs so as to rotate with the driver, and between the flange and the end plate. Each shoe is radially movable between a radially outward position in which an outer portion the shoe contacts an inner surface of the drum and a radially inward position in which the shoes are spaced apart from the drum. Each shoe has an aperture therethrough in the axial direction separating the outer portion of the shoe from an inner portion of the shoe, the outer and inner portions of the shoe being interconnected by side portions of the shoe located on either side of the aperture. A plurality of seat members span between the flange and the end plate, each seat member extending into the aperture of a corresponding shoe. A plurality of springs urge the shoes toward the radially inward position, each spring corresponding to one of the shoes. Each spring has one end engaging the inner portion of the shoe and an opposite end engaging the corresponding seat member, such that when rotation of the drive hub causes the shoes to move radially outward with respect to the hub, the springs are compressed and an air gap exists between the seat member and the shoe, thereby limiting heat transfer to the springs from the frictional interface between the outer portions of the shoes and the surface of the drum.

In yet another embodiment, a centrifugal clutch includes a drive hub having a rotational axis and a drum coaxial with the driver. The drive hub includes a hub, a flange at one axial end of the hub and an end plate at an opposite axial end of the hub. A shoe engages the drive hub so as to rotate with the driver, the shoe being radially movable between a radially outward position in which an outer portion the shoe contacts an inner surface of the drum and a radially inward position in which the shoe is spaced apart from the drum. The shoe has an aperture therethrough in the axial direction separating the outer portion of the shoe from an inner portion of the shoe, the outer and inner portions of the shoe being interconnected by side portions of the shoe located on either side of the aperture. A seat member spans between the flange and the end plate, the seat member extending through the aperture of the shoe. A spring urges the shoe toward the radially inward position. One end of the spring engages the inner portion of the shoe and an opposite end of the spring engages the seat member, such that when rotation of the drive hub causes the shoe to move radially outward with respect to the hub, the spring is compressed and an air gap exists between the seat member and the shoe, thereby inhibiting heat transfer to the spring from the frictional interface between the outer portion of the shoe and the surface of the drum.

BRIEF DESCRIPTION OF FIGURES

For purposes of illustrating the invention, the drawings show one or more preferred forms in which the invention can be embodied. The invention is not, however, limited to the precise forms shown unless such limitation is expressly made in a claim. In the drawings:

DETAILED DESCRIPTION

Figure 1:
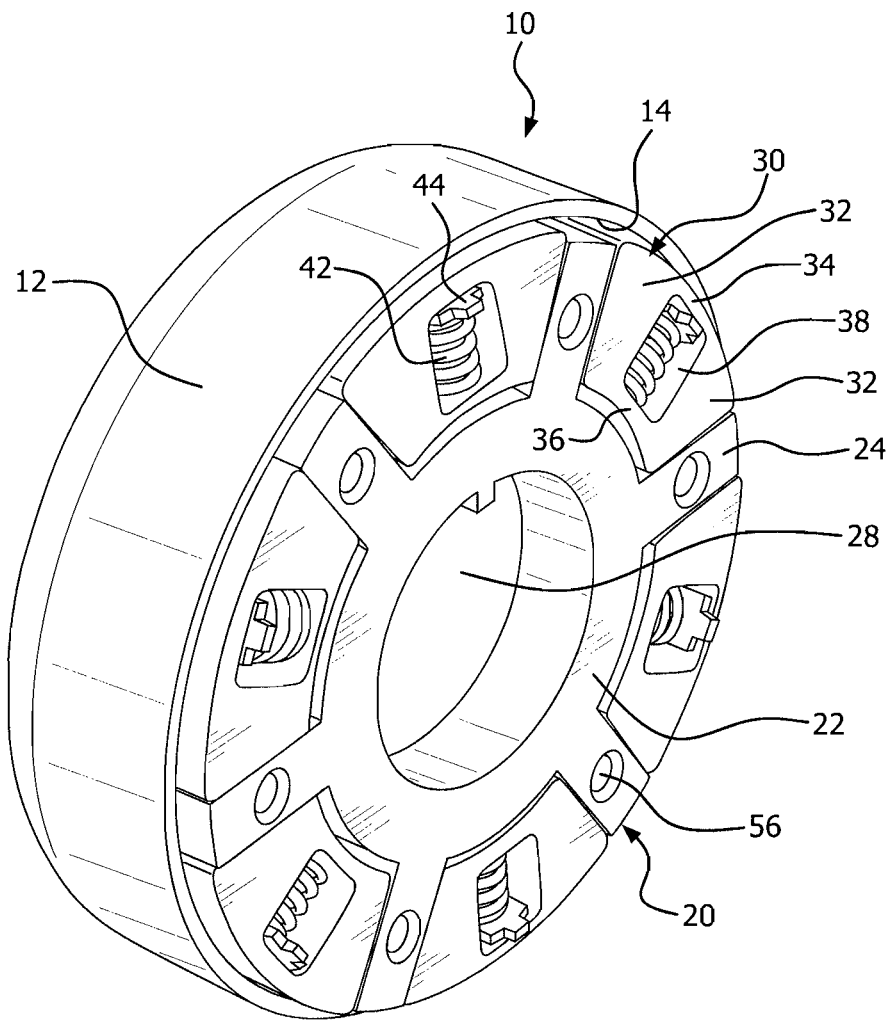
FIG. 1 is a front perspective view of an embodiment of centrifugal clutch including a plurality of clutch shoes and corresponding springs.
Figure 2:
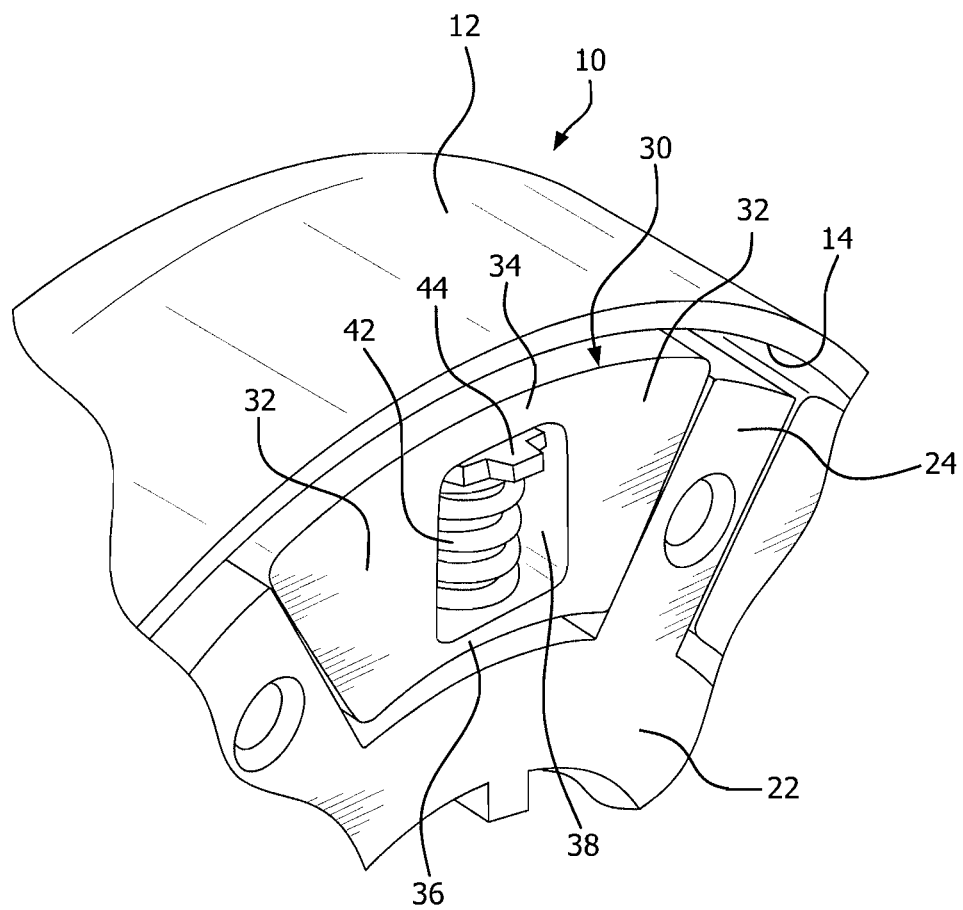
FIG. 2 is an expanded partial sectional view of a centrifugal clutch as in FIG. 1 showing a one clutch shoe and spring.
Figure 3:
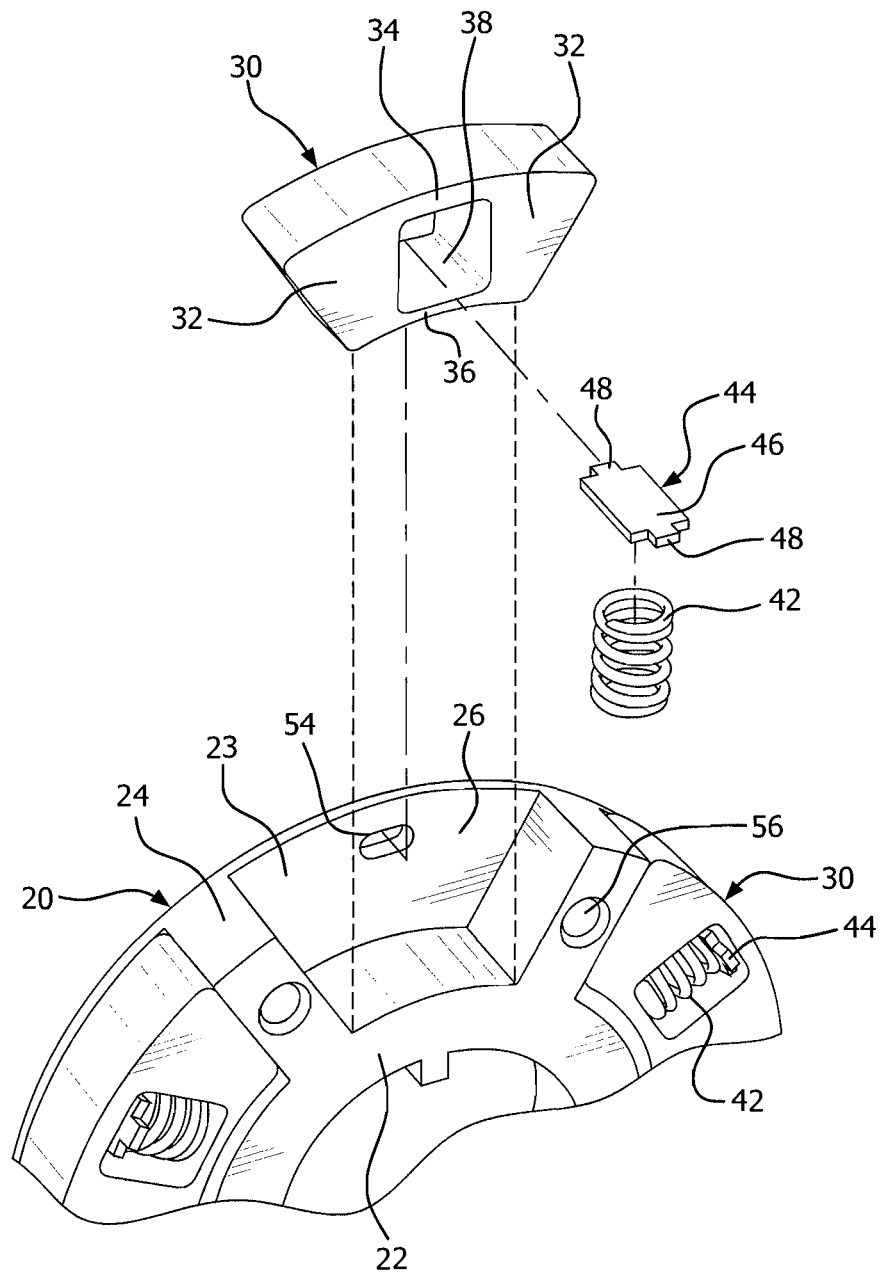
FIG. 3 is an exploded view of a portion of a centrifugal clutch as in FIG. 1.
Figure 4A:
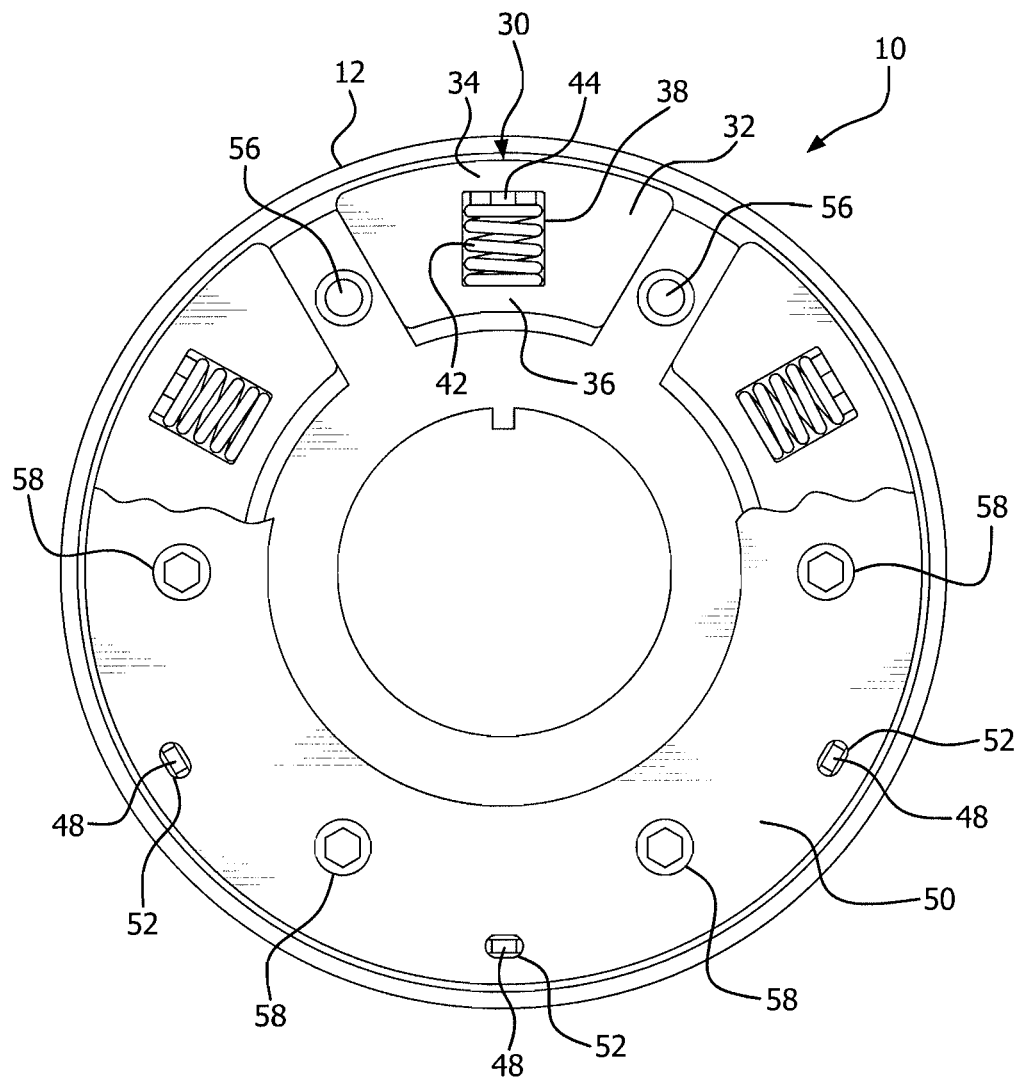
FIG. 4A is a front view of an embodiment of centrifugal clutch as in FIG. 1 in a disengaged position.
Figure 4B:
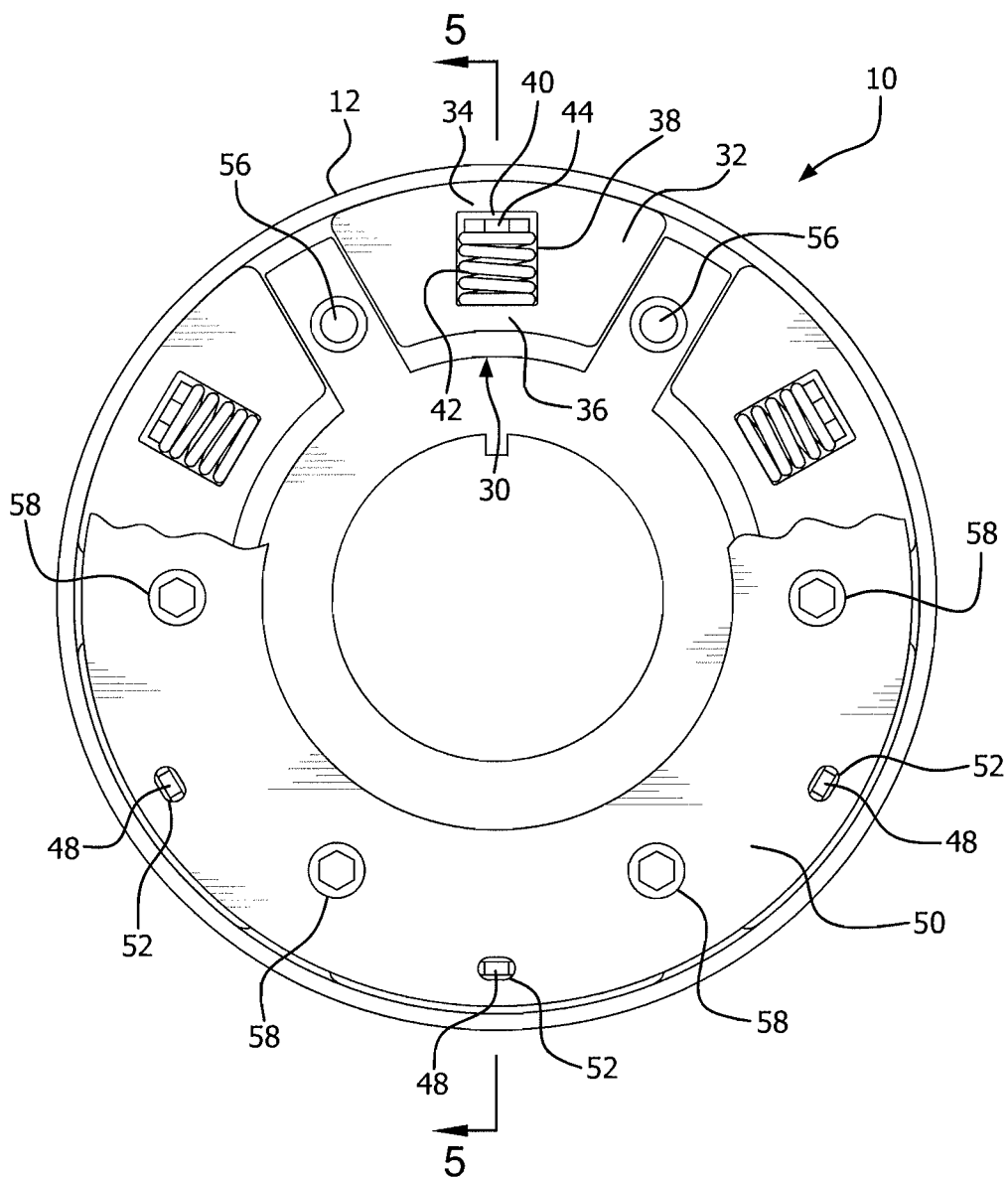
FIG. 4B is a front view of an embodiment of a centrifugal clutch as in FIG. 1 in an engaged position.
Figure 5:
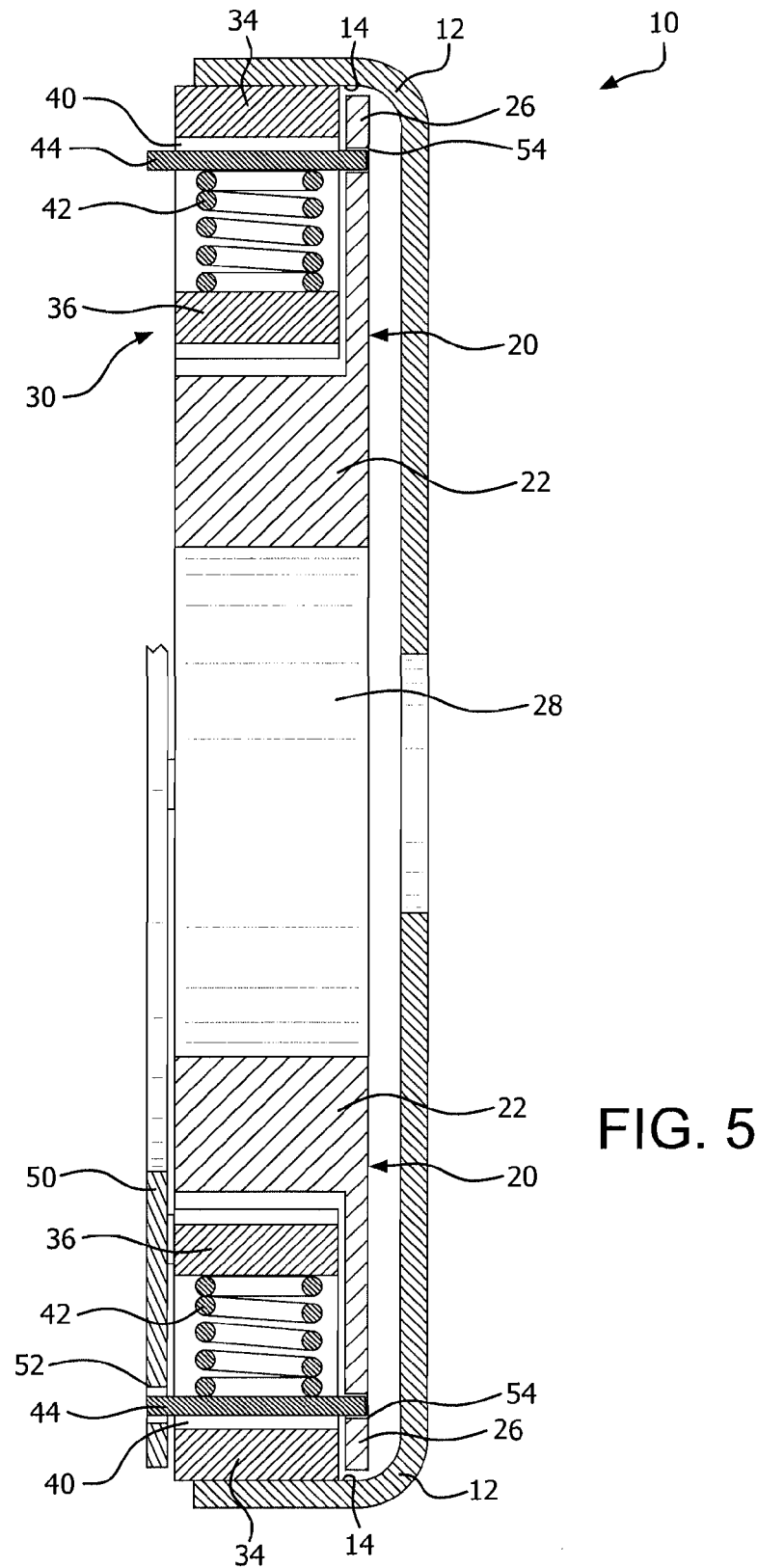
FIG. 5 is a cross-sectional view the centrifugal clutch of FIG. 4B taken through section 5-5.

FIGS. 1, 4A, and 4B show an embodiment of centrifugal clutch 10. The clutch 10 includes a drum 12 and drive hub 20 positioned coaxially with respect to an axis of rotation. The drive hub 20 is adapted to be rotated by an input shaft that transmits rotational motion from an engine or similar driving device, while the drum 12 is adapted to cause an output shaft or load to rotate. When the clutch 10 is in a disengaged position, the drum 12 can rotate relative to the drive hub 20. When the clutch 10 is in an engaged position, friction causes the drum 12 to rotate due to the rotation of the drive hub 20, because slippage may occur, the rotational speed of the drive hub 20 will be more than or equal to that of the drum 12.

The drive hub 20 includes an annular hub 22 extending in an axial direction and having a central opening or bore 28 therethrough. A flange or back plate 26 may be formed integral with or attached to the hub 22 on a first axial end or side of the hub 22. A plurality of lugs 24 project radially outwardly from the hub 22. The lugs 24 extend along at least a portion of the axial length of the hub 22. The bore 28 is generally cylindrical and is adapted to engage an input shaft of an engine or similar driving device, for example by using splines or other engagement mechanism, however it is also possible for the bore to be non-cylindrical or to include a key or keyway to provide a mechanism for engaging with the input shaft. The lugs 24 are preferably substantially equally spaced about an outer circumference of the hub 22. Each lug 24 preferably has a substantially uniform cross-section along its axial length, and may include an aperture 56 for receiving a fastener 58.

Tapered spaces 23 are defined by each pair of adjacent lugs 24, the spaces 23 being bounded at a radially inward edge by the hub 22 and on either side by the lugs 24, and on one axial end by the flange 26. The spaces 23 are shaped such that the distance between the adjacent lugs 24 increases with increasing radial distance from the center of the hub 22. In one embodiment, the drive hub 20 includes six lugs 24 evenly spaced about the circumference of the hub 22, and six tapered spaces 23 situated between each pair of adjacent lugs 24.

A clutch shoe 30 is slidably positioned in each tapered space 23. The shoe 30 is slidable in the radial direction between a radially inward position in which the shoe 30 rests on the lugs 24 and a radially outward position in which the shoe 30 is engaged in contact with a radially inner surface 14 of the drum 12. One clutch shoe 30 is installed into each space 23 in the drive hub 20. When the drive hub 20 is rotated, contact between at least one of the lugs 24 and the shoe 30 causes the shoe 30 to rotate along with, and at the same rotational speed as, the drive hub 20.

When the shoes 30 are positioned in the spaces 23, an end plate 50 is preferably mounted to the axial end of the drive hub 20 opposite the flange 26. The end plate 50 rotates with the drive hub 20. In the depicted embodiment, the end plate 50 is attached to each of the lugs 24 of the drive hub 20 by fasteners 58 engaged with the apertures 56. For example, the apertures 56 may be internally threaded holes and the fasteners 58 may be bolts.

In one embodiment of a fully assembled clutch 10, the shoes 30 are bounded at one axial end by the flange 26 and at the other axial end by the end plate 50, with sufficient space between the shoes 30 and each of the flange 26 and the end plate 50 to allow the shoes 30 to move freely in the radially inward-outward direction into and out of engagement with the inner surface 14 of the drum 12. Each shoe 30 includes a radially outer portion 34, a radially inner portion 36, and a pair of side portions 32 interconnecting the inner portion 36 to the outer portion 34, such that a generally rectangular aperture 38 is formed in and preferably through the shoe 30 in the axial direction. The aperture need not, however, be rectangular. The radially outer portion 34 contacts the inner surface 14 of the drum 12 when the clutch 10 is engaged.

A spring 42 is positioned within the aperture 38 in each shoe 30 for biasing the shoe 30 against radial outward movement. In the depicted embodiment, the spring 42 is a coil spring. A radially inward end of the spring 42 contacts the inner portion 36 of the shoe 30, while an opposite radially outward end of the spring 42 contacts a spring seat member 44. The seat member 44 may be considered to be a part of the drive hub 20 and is mounted to or formed integral with the hub 22 of the drive hub 20 and projects into the aperture 38, thus forming a projection of the back plate or flange 26.

In one embodiment wherein the seat member is removable from the back plate 26, the seat member 44 includes a body 46 and a pair of tangs 48 extending from either end of the body 46. One tang 48 is received into a slot 52 in the end plate 50 while the other tang 48 is received into a slot 54 in the flange or back plate 26. The engagement between the tangs 48 and the respective slots 52, 54 prevents radial movement of the seat member 44 with respect to the drive hub 20 and enables the spring 42 to be captured between the fixed seat member 44 and the inner portion or base 36. Thus, the spring is compressed as the shoe 30 moves radially outward with respect to the drive hub 20.

When the drive hub 20 is at rest (i.e., the drive hub 20 is not being rotated by an input shaft), the spring 42 may be under a preset amount of compression so as to urge the shoe 30 radially inward toward the hub 22 and to cause the side portions 32 of the shoe to be pressed against adjacent lugs 24 of the drive hub 20. The present amount of compression also serves to retain the spring 42 in the aperture 28. The spring could be uncompressed if there is a way of retaining the spring inside the aperture 28, such as through the use of cover 50 and flange 26.

When the drive hub 20 is rotated at low speeds, and in particular speeds insufficient to cause engagement of the clutch 10, the clutch 10 remains disengaged with the shoes 30 not contacting the radially inner surface 14 of the drum 12. In this state, the drive hub 20 and the drum 12 can freely rotate with respect to each other, and no torque is transmitted between the drive hub 20 and the drum 12 (and hence between the input shaft and the output shaft).

When the drive hub 20 is rotated at higher speeds, a speed of rotation is reached that creates a centrifugal force urging the shoes 30 to slide radially outward causing the springs 42 to compress. Engagement of the drive hub 20 with the drum 12 begins to occur at the point when the speed of rotation of the drive hub 20 generates enough centrifugal force on the shoes 30 that the springs 42 compress a sufficient amount to cause the radially outer surface of the shoes 30 to contact the radially inner surface 14 of the drum 12. The engagement speed is determined based on several factors including the mass of the shoes 30, the mass distribution of the shoes 30, and the spring force constant of the spring 42. It is well known that spring force 42 is related to distance of displacement (in this case compression) of the spring in a linear fashion under Hooke's law, with the spring force being equal to the displacement distance multiplied by the spring constant. The spring constant is an inherent property of the spring 42 which may decrease as a result of heating or plastic deformation of the spring material.

The spring 42 is compressed because the radially outer end of the spring 42 is held fixed relative to the drive hub 20 while the radially inner end of the spring 42 moves in a radially outward direction with the inner portion 36 of the shoe 30. Because the shoe 30 is of a solid construction, when the inner portion 36 of the shoe 30 moves radially outward, so does the outer portion 34 of the shoe 30, which creates an air gap 40, or enlarges an air gap 40 that already existed in the disengaged position of the clutch 10, between the spring seat member 44 and the outer portion 34 of the shoe 30. The air gap 40 aids in preventing the spring 42 from overheating during operation of the clutch 10, as explained in detail below.

At the start of clutch engagement, as the shoe 30 moves radially outward, an outer surface of the outer portion 34 of the shoe 30 contacts the radially inner surface 14 of the drum 12. At this point, the drive hub 20 and the drum 12 are not moving at the same rotational speed, so sliding friction occurs between the shoe 30 and the drum 12, causing the drum 12 to accelerate or increase in rotational speed. If the speed of rotation of the drive hub 20 is sufficiently high, the engagement force between the shoes 30 and the drum 12 may be large enough to drive an output load without slippage of the clutch 10, and the drive hub 20 and drum 12 rotate at approximately the same speed. However, in many cases, at least some slippage will occur between the shoes 30 and the inner surface 14 of the drum so that the rotational speed of the drum 12 may be somewhat less than that of the drive hub 20. Even when slippage is minimal, accelerations and decelerations, due for example to increasing the input shaft speed or increasing the output load, can momentarily increase slippage between the outer portion 34 of the shoe 30 and the inner surface 14 of the drum 12. Whenever there is slippage and sliding friction, the friction is converted into heat.

In the centrifugal clutch 10, a significant portion of the frictional heat generated by slippage between the shoes 30 and the drum 12 is conducted to and dissipated by the drum 12. The remainder of the heat is conducted into the outer portion 34 of the shoes 30, and is not directly conducted into the drive hub 20. Because the gap 40 exists between the spring seat member 44 and the outer portion 34 of the shoe 30, heat also is not conducted directly to the seat member 44, and thus the spring 42 is protected from heat conduction at its radially outer end. From the outer portion 34 of the shoe 30, heat is conducted into the side portions 32, and from there to the inner portion 36 of the shoe 30. From the inner portion 36 of the shoe 30, heat can be conducted into the radially inner end of the spring 42. However, by this point, the heat has had to travel along and heat up the side portions 32 and the inner portion 36 of the shoe 30, and much of the frictional heat generated by engagement between the outer portion 34 of the shoe and the drum 12 has been dissipated. Therefore, the amount of heat reaching the inner end of the spring 42 is substantially less than the amount of heat that could otherwise have reached the outer end of the spring 42 but for the existence of the gap 40.

Heat will also be conducted from the side portions 32 into the lugs 24 of the drive hub 20, and then into the flange 26 and end plate 50. However, by the time any of this heat can be conducted all the way to the slot 54 in the flange 26 or the slot 52 in the end plate 50, most of the heat has been dissipated and only a minimal amount of heat is transferred to the spring seat member 44 and thus to the outer end of the spring 42.

In addition, in one embodiment, the gap 40 remains between the outer portion 34 of the shoe 30 and the seat member 44 at the outer end of the spring 42 when the clutch 10 is in the disengaged position, so that even in that state, heat cannot be directly conducted from the outer portion 34 of the shoe 30 through the seat member 44 to the outer end of the spring 42. It has been determined that an air gap 40 of approximately 0.062 inches is more than enough to substantially prevent or limit the heat conduction and radiation.

Figure 6:
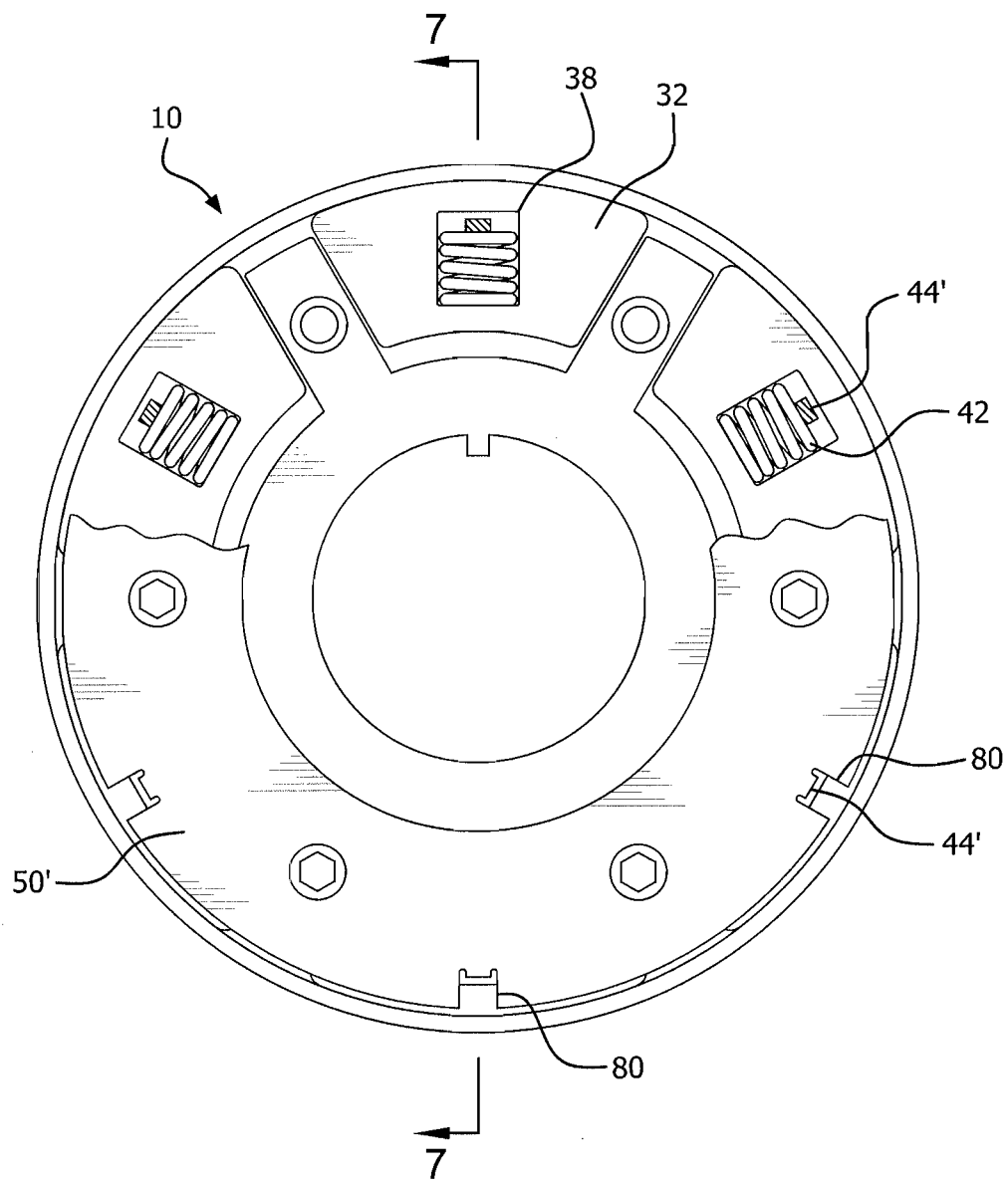
FIG. 6 is a front view of an alternate embodiment of the centrifugal clutch according to the invention with a different seat arrangement.
Figure 7:
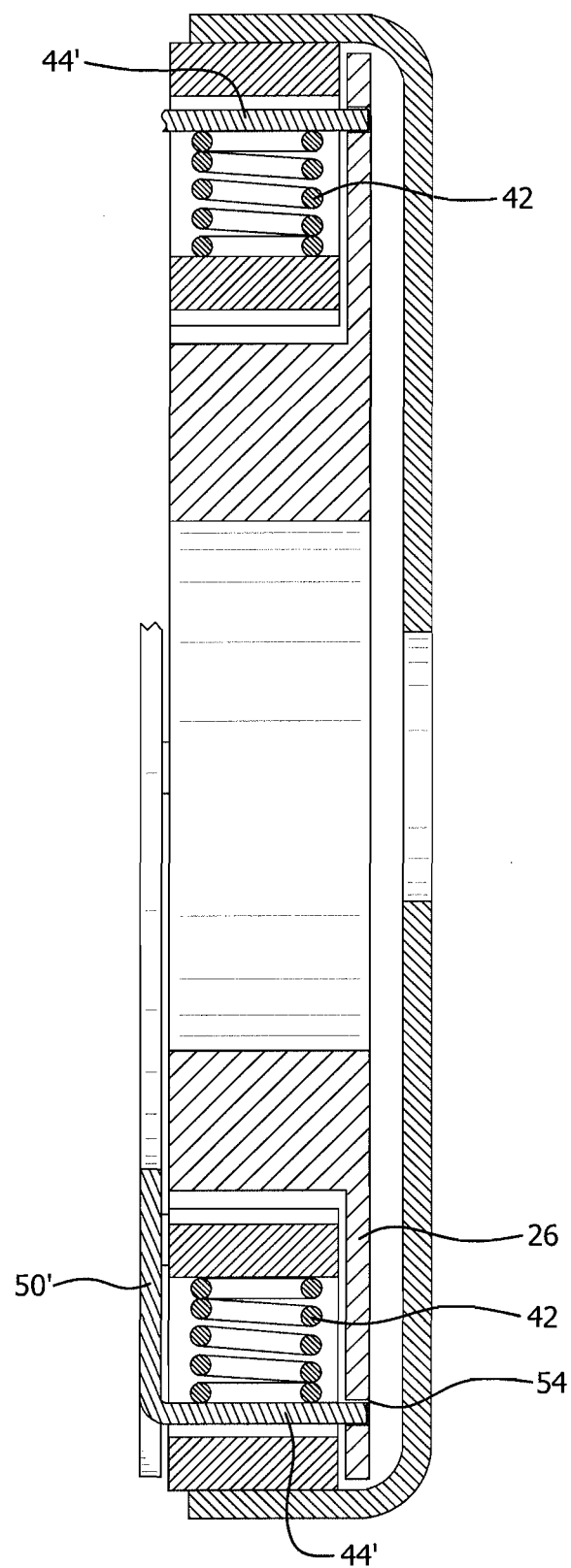
FIG. 7 is a cross-sectional view of the centrifugal clutch of FIG. 6 taken through section 7-7.

FIGS. 6 and 7 illustrate an alternate embodiment of the end plate 50 of the centrifugal clutch. In this embodiment, the spring seat members 44' are formed as integral parts of the end plate 50. More specifically, the end plate 50, has radial cuts 80 formed it in so as to create tabs which are then bent inward to form the spring seat members 44'. The spring seat members 44' extend into the slots 54 in the flange 26.

The centrifugal clutch 10 according to the present invention has been found to be markedly less susceptible to the phenomenon of thermal relaxation of the springs as the clutch heats up, as compared with existing clutches. As such, the clutch is capable of slipping longer than conventional clutches.

Although described in connection with exemplary embodiments thereof, it will be appreciated by those skilled in the art that additions, deletions, modifications, and substitutions not specifically described may be made without departing from the spirit and scope of the invention as defined in the appended claims, and that the invention is not limited to the particular embodiments disclosed.

The invention claimed is:

1. A centrifugal clutch comprising:
   a drive hub having a rotational axis;
   a drum coaxially disposed about the drive hub with a inner engagement surface;
   a plurality of shoes engaging the drive hub so as to rotate with the drive hub, each shoe having an aperture formed in it, the shoes being radially movable between a radially outward position in which the shoes contact a surface of the inner engagement surface of the drum and a radially inward position in which the shoes are spaced apart from the inner engagement surface drum; and
   a plurality of springs biasing the shoes against radial outward movement, each spring being located in the aperture of a corresponding shoe, each spring having a radially inward end engaging one of the shoes and an opposite radially outward end engaging the drive hub;
   wherein the drive hub includes a flange at one axial end thereof and a plurality of seat members supported by the flange, each seat member extending into the aperture of a corresponding one of the plurality of shoes and engaging the radially outward end of the corresponding spring so as to provide engagement between the spring and the drive hub;
   wherein the drive hub further includes a removable end plate at an opposite axial end thereof, the end plate engaged to the seat members;
   wherein the removable end plate includes a plurality of slots spaced about the plate, each slot located so as to align with one of the apertures in the shoe; and
   wherein each seat member includes an end that extends into a corresponding slot in the end plate so as to provide the engagement between the seat member and the end plate.

2. The centrifugal clutch of claim 1, wherein the drive hub includes a hub and a plurality of lugs extending radially outward from the hub, the lugs defining spaces for receiving the shoes, each shoe being located between an adjacent pair of lugs.

3. The centrifugal clutch of claim 1, wherein when rotation of the drive hub causes the shoes to move radially outward with respect to the drive hub, the springs are compressed and a gap exists between each seat member and corresponding shoe, thereby inhibiting heat transfer to the springs from the frictional interface between the shoes and the surface of the drum.

4. The centrifugal clutch of claim 3, wherein the gap further exists between each seat member and corresponding shoe when the shoes are in a radially inwardmost position.

5. The centrifugal clutch of claim 1, wherein each shoe includes an outer portion for contacting the inner engagement surface of the drum, an inner base portion engaging the radially inward end of the corresponding spring, and side portions on either side of the aperture interconnecting the outer portion to the inner portion.

6. A centrifugal clutch comprising:
   a drive hub having a rotational axis, the drive hub including a hub, a flange at one axial end of the hub, a removable end plate at an opposite axial end of the hub, and a plurality of lugs extending radially outward from the hub between the flange and the end plate, the lugs being spaced apart about the circumference of the hub;
   a drum located coaxially around the drive hub and having an inner engagement surface;
   a plurality of shoes each located between an adjacent pair of lugs so as to rotate with the drive hub, each shoe being radially movable between a radially outward position in which an outer portion the shoe contacts the inner engagement surface of the drum and a radially inward position in which the shoes are spaced apart from the drum, each shoe having an aperture or recess formed in the shoe separating the outer portion of the shoe from an inner portion of the shoe, the outer and inner portions of the shoe being interconnected by side portions of the shoe located on either side of the aperture;
   a plurality of seat members, each seat member extending from the flange into the aperture of a corresponding shoe; and
   a plurality of springs biasing the shoes against radial outward movement, each spring corresponding to one of the shoes, an end of the spring engaging the inner portion of the shoe and an opposite end of each spring engaging the corresponding seat member, such that when rotation of the drive hub causes the shoes to move radially outward with respect to the hub, the springs are compressed and a gap exists between the seat member and the shoe, the gaps inhibiting heat transfer to the radial outer ends of the springs from the outer portions of the shoes; and
   wherein the removable end plate includes a plurality of slots spaced about the plate, each slot located so as to align with one of the apertures in the shoe; and wherein each seat member includes an end that extends into a corresponding slot in the end plate so as to engage the end plate.

7. The centrifugal clutch of claim 6, wherein the gap further exists between each seat member and corresponding shoe when the shoes are in a radially inwardmost position.

8. The centrifugal clutch of claim 6, wherein the drive hub has six lugs, wherein the clutch has six shoes, one shoe located between each adjacent pair of the six lugs, six seat members, one seat member extending through the aperture of each shoe, and six springs, one spring being located in the aperture of each shoe.

9. A centrifugal clutch comprising:
- a drive hub having a rotational axis, the drive hub including a hub, a flange at one axial end of the hub, and a removable end plate at an opposite axial end of the hub;
- a drum located coaxially around the drive hub and having an inner engagement surface;
- a plurality of shoes, each shoe engaging the drive hub so as to rotate with the drive hub, each shoe being radially movable between a radially outward position in which an outer portion the shoe contacts an inner surface of the drum and a radially inward position in which the shoe is spaced apart from the drum, each shoe having an aperture or recess formed in an axial side of the shoe so as to separate the outer portion of the shoe from an inner portion of the shoe, the outer and inner portions of the shoe being interconnected by side portions of the shoe located on either side of the aperture;
- a plurality of seat members, each seat member extending from the flange into the aperture of a corresponding shoe; and
- a plurality of springs biasing the shoes against radial outward movement, an end of the each spring engaging the inner portion of a corresponding shoe and an opposite end of each spring engaging a corresponding seat member, such that when rotation of the drive hub causes the shoes to move radially outward with respect to the hub, each spring is compressed and a gap exists between each seat member and the shoe, the gap inhibiting heat transfer to the radial outer end of the spring from the outer portion of the shoe; and
- wherein the removable end plate indludes a plurality of slots spaced about the plate, each slot located so as to align with one of the apertures in the shoe; and wherein each seat member includes an end that extends into a corresponding slot in the end plate so as to engage the end plate.

10. The centrifugal clutch of claim 9, wherein the gap further exists between each seat member and corresponding shoe when the shoes are in a radially inwardmost position.

11. The centrifugal clutch of claim 9, the drive hub further including at least two lugs extending radially outward from the hub between the flange and the end plate, the shoe being located between the lugs.

* * * * *